June 8, 1926.
H. W. TINKER
BUMPER FOR VEHICLES
Filed Feb. 15, 1924
1,587,808
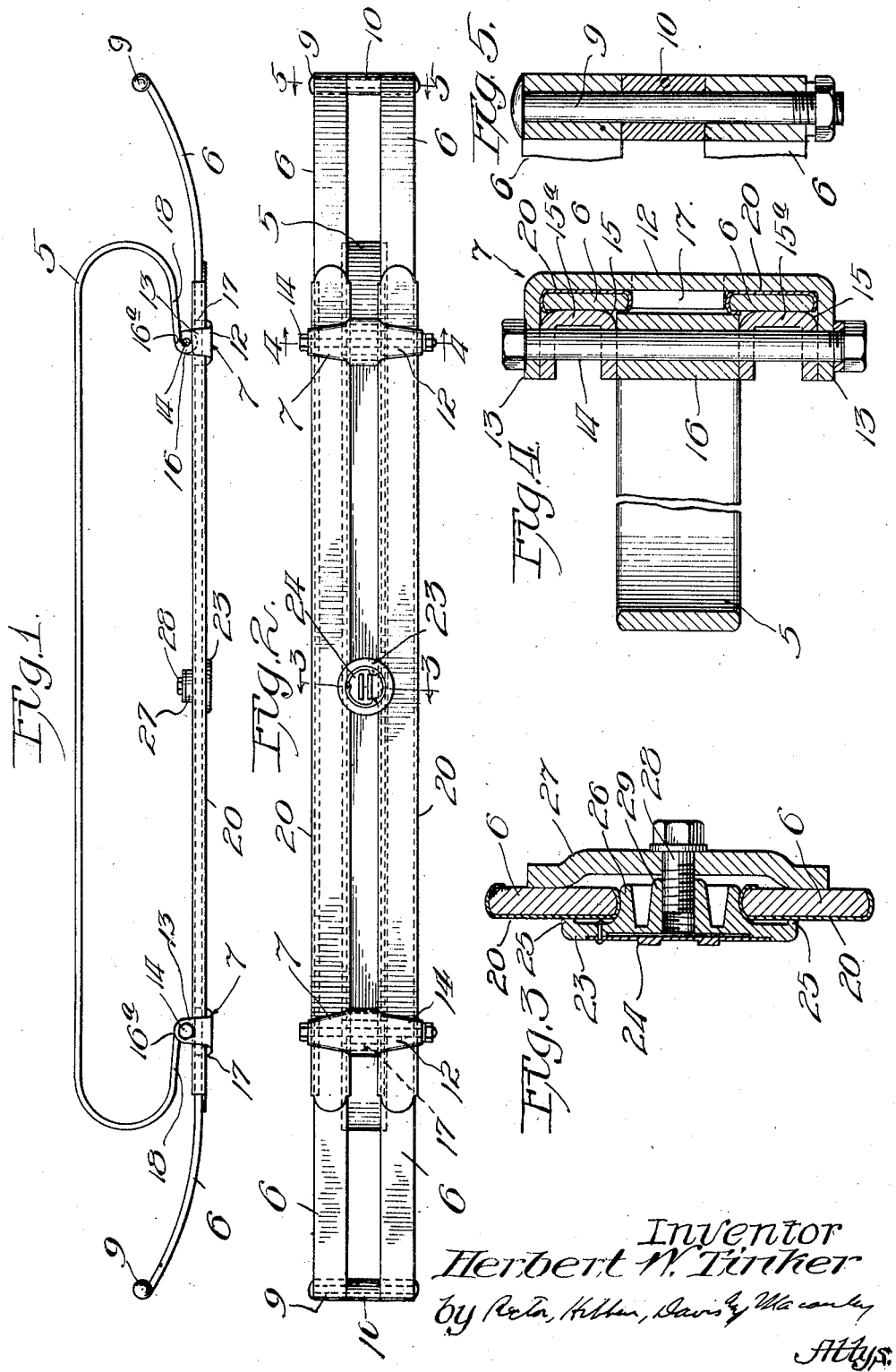
Inventor
Herbert W. Tinker Patented June 8, 1926.

1,587,808

UNITED STATES PATENT OFFICE.

HERBERT W. TINKER, OF MILWAUKEE, WISCONSIN, ASSIGNOR TO FEDERAL PRESSED STEEL COMPANY, OF MILWAUKEE, WISCONSIN, A CORPORATION OF WISCONSIN.

BUMPER FOR VEHICLES.

Application filed February 15, 1924. Serial No. 692,954.

My invention relates to bumpers for vehicles and has for its general object to provide a bumper which is simple in design, cheap to manufacture, efficient and durable in use, and attractive in appearance.

One of the more particular objects of my invention is to provide a bumper having an improved form of means for attaching the supporting arms, preferably formed of a spring-metal strip or strips, to the impact bar or bars in such a manner that rattle of the parts, due to loose play, is entirely eliminated while at the same time the parts are free to function properly and efficiently, simple and cheap in construction and readily assembled and disassembled.

Another object of my invention is to provide an improved form of sheath or cover for the impact bar or bars so as to give the bars an improved or preferred finish, such as nickel-plate, the sheath being so constructed as to be readily attached to the impact bar without the use of tools or danger of cracking or injuring the nickel plate or other finish.

Other and further objects and advantages of my improved bumper will become apparent from the following description, taken in conjunction with the accompanying drawings.

In the drawings, Fig. 1 is a top plan view of a bumper embodying my invention; Fig. 2 is a front elevation of the same; Fig. 3 is a sectional view taken through the impact bars and the trademark plate, as on the line 3—3 of Fig. 2; Fig. 4 is a sectional view taken through one of the brackets and impact bars as on the line 4—4 of Fig. 2; and Fig. 5 is a sectional view taken through the ends of the impact bars as on the line 5—5 of Fig. 2.

In general the bumper, embodying my invention, comprises a spring supporting member 5, which is preferably formed from a strip of spring metal, two parallel impact bars 6, likewise formed of spring metal, and suitable devices, designated generally by the reference numerals 7, for securing the ends of the supporting member 5 to the impact bars 6.

The central portions of the impact bars are straight and their ends are curved slightly rearwardly, as best shown in Fig. 1. The ends of the impact bars 6 are rolled to form eyes through which extend the bolts 9 (Fig. 5), the ends of the bars being separated by spacing sleeves or collars 10 through which the bolts extend.

Each of the devices for securing the ends of the member 5 to the impact bars comprises a bracket 12, which is preferably formed of sheet-metal and which is channel-shaped in vertical section as best shown in Fig. 4, the rearwardly extending ends or ears 13, forming horizontal flanges on the member 12, being parallel and provided with aligned openings through which a bolt 14 is adapted to extend. The bolt 14 also extends through aligned openings in the rearwardly extending flanges of U-shaped spacers 15 which are interposed between the ears 13 and an eye 16 formed in the end of the member 5. The vertical portions 15ª of the spacers 15 contact with the inner faces of the impact bars 6 while the ears 13 contact with the outer horizontal flanges of the spacers, the inner flanges of which contact directly with the opposite ends of the eye 16. These spacers are preferably formed of yielding sheet-metal so that when the nut on the lower end of the bolt 14 is screwed up tightly the ears 13 and outer flanges of the spacers are drawn or flexed somewhat towards each other, which tends to compress the spacers 15. The drawing of the outer flanges of the spacers 15 toward each other causes the vertical connecting portions 15ª of the spacers to be bowed or flexed slightly forwardly and hence these portions press firmly against the inner side of the impact bars and the latter in this way are firmly held between these portions and the vertical portion of the bracket 12. In this fashion the parts are firmly held in contact with each other so that all loose-play and hence rattle, is eliminated. It will also be observed that the member 12 is provided with inwardly extending integral lips or projections 17 which project between the impact bars and are adapted to contact with their adjacent or facing edges (or the sheaths 20 thereon, as will be later described) and when the ears 13 are drawn towards each other they press the impact bars firmly against the ends of the projections 17 to prevent all vertical play of the impact bars relative to the brackets. The projections 17 are preferably formed integral with the brackets 12 and there are two such projections on each bracket although one may be eliminated if desired.

The upper ear 13 of the right-hand bracket, shown in Fig. 1, has been broken away and the upper spacer omitted in order to expose the eye 16 of the supporting member 5. It will be noted that the eye is so formed or rolled that the end of the member 5 (at the point 16ª) where the eye begins, is to the rear of the bolt 14, the metal being rolled so that the eye is in front of the end of the member 5 instead of being rolled in the opposite way to bring it to the rear of the point 16ª as is the case in previous bumpers of this general type. I form the eye 16 as described so that the portion 18 of the member 5 is spaced a considerable distance from the impact bars to permit considerable movement of the impact bars, due to impact with an object, before the impact bars contact with the portion 18, thus allowing considerably more effective bending or action of the curved end 18ª of the member 5 than would be the case if the impact bars immediately contacted with the portion 18 when the bars struck an object.

For the purpose of illustration I have shown the impact bars as being supported by the one-piece member 5. I preferably cover the central straight portions of the impact bars with sheaths or covers 20. These sheaths are preferably formed of brass which has been nickel-plated so as to improve the appearance of the bumper. The upper edge portions of the sheaths are formed to provide inverted U-shape channels which fit over the upper edges of the impact bars. The opposite or lower edge portions of the sheaths are formed to provide flanges curved to conform to the curvature of the lower edges of the impact bars. In applying the sheaths to the impact bars, the upper channeled or U-shaped portions of the sheaths are fitted over the upper edges of the impact bars and then the finger of the person performing the assembly is pressed against one end of the sheath and run along the sheath so as to force the lower curved edge of the sheath to snap over the lower curved edge of the impact bar, the brass being of such a gauge as to permit the ready application of the sheath in this manner. It will be obvious that for the purpose of applying the sheaths to the impact bars no tools or further bending or rolling of the sheaths is necessary and therefore the nickel-plate on the sheaths is not cracked or injured in any way. Furthermore, the sheaths may be readily detached for the purpose of re-nickel-plating them or replacing them in case that is desirable or necessary.

At the center of the impact bars and between them I mount a disc 23 carrying the trade mark plate 24. This disc is provided with a rearwardly extending peripheral rib 25 which presses against the forward sides of the sheaths or impact bars. The disc is also provided with the rearwardly extending circular flange or rib 26, the outer side of which is slightly inclined so as to fit snugly and firmly against the facing edges of the sheaths. A strip of metal or other suitable member 27 is formed so that its ends press against the rear faces of the impact bars, and a bolt 28 projects through the center of the member 27 and is adapted to screw into a boss 29 on the disc 23 for the purpose of securing the member 27 and the disc 23 in position on the impact bars.

I claim:

1. In a bumper, the combination of impact bars, a supporting member therefor, a bracket, and yielding spacers between said bracket and member, one of said yielding spacers being positioned adjacent each edge of the supporting member and lying in substantially the same vertical plane thereof.

2. In a bumper, the combination of impact bars, a supporting member therefor, a sheet-metal bracket having yielding ends, and yielding sheet-metal spacers between said bracket and member.

3. In a bumper, the combination of impact bars, a supporting member therefor, a bracket, yielding spacers, and an element for securing the bracket, spacers and member together and causing the spacers to press the member between them and press the bars against the bracket.

4. In a bumper, the combination of impact bars, a supporting member therefor, a bracket having yielding ends, yielding spacers interposed between said ends and member, and means for drawing said ends and spacers together to firmly grip said member between said spacers and firmly grip the bars between the spacers and bracket.

5. In a bumper, the combination of impact bars, a supporting member therefor, a bracket having a projection extending between said bars, and yielding spacers between said bracket and member.

6. In a bumper, the combination of impact bars, a supporting member therefor, a sheet-metal bracket having yielding ends, yielding spacers between said member and ends, and projections on said bracket extending between said bars.

7. In a bumper, the combination of two parallel impact bars, a supporting spring having an eye, a bracket having yielding ends projecting about the outer edges of said bars, yielding spacers between said ends and eye, a projection on said bracket extending between and engaging the facing edges of said bars, and a bolt projecting through said ends, the spacers and eye.

8. In a bumper, the combination of two impact bars, a supporting spring having an eye, a bracket having parallel yielding ends projecting about the outer edges of said bars, a projection on said bracket projecting between said bars and engaging their facing edges, U-shaped yielding spacers between said ends of the bracket and eye, and a bolt projecting through said ends, spacers and eye.

9. In a bumper, the combination of two impact bars, a supporting spring member having an eye, a bracket having a vertical portion engaging the outer faces of said bars and two parallel yielding ends projecting about the outer edges of said bars, integral inwardly projecting extensions on said brackets projecting between said bars and engaging their facing edges, U-shaped yielding spacers between said ends of the bracket and eye, and a bolt extending through said ends, the parallel projecting portions of said spacers and said eye and adapted to flex the spacers to prevent play between said ends, the spacers and the eye and force the vertical portions of the spacers firmly against the inner faces of the bars.

10. In a bumper, a flat impact bar having slightly curved edges, a sheath or cover formed of thin resilient metal and differently formed at its edge portions, the upper edge portion being channel-shaped with the inner downwardly extending flange thereof engaging the rear side of the bar and the lower edge portion of the sheath being formed to provide only a slightly curved rearwardly extending flange terminating at the corner between the rear flat face of the bar and its lower curved edge so that the sheath may be readily snapped into place on the bar and be easily removed.

HERBERT W. TINKER.